United States Patent [19]

Manganiello et al.

[11] Patent Number: 5,486,278
[45] Date of Patent: Jan. 23, 1996

[54] TREATING PREBAKED CARBON COMPONENTS FOR ALUMINUM PRODUCTION, THE TREATED COMPONENTS THEREOF, AND THE COMPONENTS USE IN AN ELECTROLYTIC CELL

[75] Inventors: Fausto Manganiello, Portoscuso, Italy; Jean-Jacques Duruz, Geneva, Switzerland; Vittorio Bello, Portoscuso, Italy

[73] Assignee: Moltech Invent S.A., Luxembourg

[21] Appl. No.: 218,679

[22] Filed: Mar. 28, 1994

[30] Foreign Application Priority Data

Jun. 2, 1993 [EP] European Pat. Off. .............. 93810401
Aug. 2, 1993 [EP] European Pat. Off. .............. 93810545

[51] Int. Cl.$^6$ .............................. C25C 7/00; C25C 3/08
[52] U.S. Cl. .................. 204/243 R; 204/290 R; 204/294; 204/67; 427/113; 427/126.1; 427/430.1
[58] Field of Search .................... 204/67, 243 R, 204/290 R, 291, 294, 284, 279; 427/113, 126.1, 443.2, 430.1; 264/105; 252/502

[56] References Cited

U.S. PATENT DOCUMENTS

| | | | |
|---|---|---|---|
| 3,016,288 | 1/1962 | Andrieux èt al. .......................... 23/204 |
| 3,028,324 | 4/1962 | Ransley ................................. 204/67 |
| 3,330,756 | 7/1962 | Ransley ................................ 204/279 |
| 3,348,929 | 1/1963 | Valtschev et al. ......................... 29/180 |
| 3,442,787 | 5/1969 | Collum ................................ 204/294 |
| 3,705,791 | 9/1970 | Bredzs ................................ 29/195 |
| 3,852,107 | 12/1974 | Lorkin et al. ......................... 117/228 |
| 3,856,650 | 12/1974 | Kugler et al. ....................... 204/243 R |
| 3,939,028 | 2/1976 | Schiffarth et al. ....................... 156/306 |
| 3,969,124 | 7/1976 | Stewart ............................... 106/56 |
| 4,308,114 | 12/1981 | Das et al. ............................ 204/67 |
| 4,308,115 | 12/1981 | Foster, Jr. et al. ....................... 204/67 |
| 4,333,813 | 6/1982 | Kaplan et al. ....................... 204/243 R |
| 4,342,637 | 8/1982 | Withers et al. ......................... 204/282 |
| 4,374,761 | 2/1983 | Ray ................................ 252/519 |
| 4,439,382 | 3/1984 | Joó et al. ............................ 427/113 |
| 4,439,491 | 3/1984 | Wilson ............................... 428/408 |
| 4,460,440 | 7/1984 | McGeer .............................. 204/67 |
| 4,466,996 | 8/1984 | Boxall et al. ......................... 427/122 |
| 4,532,017 | 7/1985 | Keinborg et al. ....................... 204/67 |
| 4,533,452 | 8/1985 | Leroy et al. ....................... 204/243 R |
| 4,535,035 | 8/1985 | Smialek et al. ....................... 428/698 |
| 4,540,475 | 9/1985 | DeAngelis ........................... 204/67 |
| 4,544,457 | 10/1985 | Sane et al. .......................... 204/67 |
| 4,559,270 | 12/1985 | Sara ................................. 428/408 |
| 4,560,448 | 12/1985 | Sane et al. .......................... 204/67 |
| 4,567,103 | 1/1986 | Sara ................................. 428/408 |
| 4,582,553 | 4/1986 | Buchta ............................... 156/242 |
| 4,595,545 | 6/1986 | Sane ................................. 264/65 |
| 4,600,481 | 7/1986 | Sane et al. .......................... 204/67 |
| 4,605,440 | 8/1986 | Halverson et al. ...................... 75/238 |
| 4,610,726 | 9/1986 | King ................................. 75/233 |
| 4,610,857 | 9/1986 | Ogawa et al. ......................... 423/335 |
| 4,613,375 | 9/1986 | Forster et al. ....................... 106/281 R |
| 4,650,552 | 3/1987 | de Nora et al. ....................... 204/67 |
| 4,655,830 | 4/1987 | Akashi et al. ......................... 75/233 |
| 4,670,201 | 6/1987 | Montgomery .......................... 264/26 |
| 4,678,760 | 7/1987 | Ray ................................. 501/96 |
| 4,680,094 | 7/1987 | Duruz .............................. 204/67 |
| 4,710,348 | 12/1987 | Brupbacher et al. ..................... 420/129 |
| 4,738,389 | 4/1988 | Moshier et al. ........................ 228/198 |
| 4,751,048 | 6/1988 | Christodoulou et al. ............... 420/129 |
| 4,769,074 | 9/1988 | Holcombe, Jr. et al. ............. 106/14.12 |
| 4,772,452 | 9/1988 | Brupbacher et al. ..................... 420/129 |
| 4,774,052 | 9/1988 | Nagle et al. .......................... 420/129 |
| 4,808,372 | 2/1989 | Koczak et al. ......................... 420/457 |
| 4,824,531 | 4/1989 | Duruz et al. .......................... 204/67 |
| 4,836,982 | 6/1989 | Brupbacher et al. ..................... 420/129 |
| 4,909,842 | 3/1990 | Dunmead et al. ....................... 75/236 |
| 4,915,903 | 4/1990 | Brupbacher et al. ..................... 420/129 |
| 4,929,328 | 5/1990 | Besmann et al. ........................ 204/279 |
| 4,948,676 | 8/1990 | Darracq et al. ....................... 428/539.5 |
| 4,961,778 | 10/1990 | Pyzik et al. .......................... 75/230 |
| 4,985,202 | 1/1991 | Moshier et al. ........................ 420/590 |
| 4,988,645 | 1/1991 | Holt et al. ........................... 501/91 |
| 5,019,225 | 5/1991 | Darracq et al. ....................... 204/243 R |
| 5,071,533 | 12/1991 | de Nora et al. ....................... 204/243 R |
| 5,077,246 | 12/1991 | Weaver et al. ........................ 501/98 |
| 5,110,688 | 5/1992 | Sekhar et al. ......................... 428/552 |
| 5,112,654 | 5/1992 | Claar ............................... 427/376.6 |
| 5,149,595 | 9/1992 | Kojo et al. .......................... 428/552 |
| 5,158,655 | 10/1992 | Townsend ............................ 204/67 |
| 5,188,678 | 2/1993 | Sekhar et al. ......................... 148/514 |
| 5,194,330 | 3/1993 | Vandenbulcke et al. ............... 428/336 |
| 5,198,188 | 3/1993 | Holt et al. .......................... 419/45 |
| 5,213,730 | 5/1993 | Hida ................................. 264/63 |
| 5,217,583 | 6/1993 | Sekhar et al. ......................... 204/67 |
| 5,250,324 | 10/1993 | Claar ............................... 427/376.10 |
| 5,310,478 | 5/1994 | Sekhar et al. ......................... 205/230 |
| 5,316,718 | 5/1994 | Sekhar ............................... 419/19 |
| 5,320,717 | 6/1994 | Sekhar ............................... 204/67 |
| 5,340,014 | 8/1994 | Sekhar et al. ......................... 228/198 |
| 5,340,448 | 8/1994 | Sekhar et al. ......................... 204/67 |
| 5,342,491 | 8/1994 | Sekhar .............................. 204/243 R |
| 5,362,366 | 11/1994 | de Nora et al. ........................ 204/67 |
| 5,364,442 | 11/1994 | Sekhar ............................... 75/229 |
| 5,364,513 | 11/1994 | Sekhar et al. ....................... 204/243 R |
| 5,374,342 | 12/1994 | Sekhar .............................. 204/243 R |
| 5,376,421 | 12/1994 | Sekhar et al. ......................... 427/224 |
| 5,378,327 | 1/1995 | Sekhar et al. ......................... 204/67 |
| 5,397,450 | 3/1995 | Sekhar et al. ....................... 204/243 R |
| 5,409,589 | 4/1995 | Sekhar .............................. 204/279 |
| 5,413,689 | 5/1995 | de Nora et al. ....................... 204/279 |

FOREIGN PATENT DOCUMENTS

| | | |
|---|---|---|
| 2809295 | 2/1979 | Germany . |
| 3538294 | 4/1987 | Germany . |
| WO9325731 | 12/1993 | WIPO . |

*Primary Examiner*—Kathryn Gorgos
*Attorney, Agent, or Firm*—Dinsmore & Shohl

[57] ABSTRACT

A prebaked carbon-based anode of an electrolytic cell for the production of aluminium, in particular by the electrolysis of alumina in a molten fluoride electrolyte, is treated over its sides and top to improve the resistance thereof to erosion during operation of the cell by oxidising gases released at the anode, by immersing the anode in a boron-containing solution containing 5–60 weight % of $H_3BO_3$ or $B_2O_3$ in methanol, ethylene glycol, glycerin or water with a surface-active agent, e.g. at 80° to 120° C. After 2–60 minutes immersion, the boron-containing solution is impregnated to a depth of 1–10 cm, usually about 2–4 cm over the top and side surfaces of the anode to be protected, producing a concentration of boron in the impregnated surface from 200 ppm to 0.35%. The same treatment can be applied to cell sidewalls.

28 Claims, No Drawings

TREATING PREBAKED CARBON COMPONENTS FOR ALUMINUM PRODUCTION, THE TREATED COMPONENTS THEREOF, AND THE COMPONENTS USE IN AN ELECTROLYTIC CELL

FIELD OF THE INVENTION

This invention relates to components, in particular prebaked carbon anodes and sidewalls, of electrolytic cells for the production of aluminium especially by the electrolysis of alumina in a molten fluoride electrolyte such as cryolite, and is particularly concerned with improving the resistance to oxidation of the sides and top of prebaked anodes and of sidewalls which are exposed to air and oxidizing gases during cell operation.

BACKGROUND ART

Aluminium is produced conventionally by the Hall-Héroult process, by the electrolysis of alumina dissolved in cryolite-based molten electrolytes at temperatures up to around 950° C. In Hall-Héroult cells, the anodes are usually prebaked carbon blocks that are consumed by the electrochemical reaction, corroded by contact with the electrolyte and disintegrated by the evolved oxidising gases.

Prebaked anodes for aluminium production are made of a matrix of petroleum coke with pitch as binder. Their production involves various phases including preparing and treating the starting materials, mixing, forming and calcining at high temperature, followed by securing the current supply member by rodding.

The production of aluminium involves a complex reaction summarized by the relationship:

$$Al_2O_3 + C \rightarrow Al + CO_2$$

with a theoretical consumption of 0.334 kg of the anodic carbon per kilo of product aluminium. However, the real anode consumption is 40–50% greater, and amounts to about 20% of the production cost of the aluminium.

The above-stoichiometric consumption of carbon stems from a series of secondary reactions or parasitic phenomena, subdivided as follows:

oxidizing reactions with oxygen from the air which contacts the upper part of the anode and, if the latter is non-protected, reacts ($C + O_2 \rightarrow CO_2$);

carbo-oxidation reactions with $CO_2$ at the surface of the anode immersed in the electrolyte: the so-called "Boudouard equilibrium" ($C + CO_2 \rightarrow CO$); and selective oxidation of pitch coke with respect to petroleum coke, with consequent release of carbon particles which tend to deposit on the surface of the electrolyte, interfering with the electrolysis and increasing the electrolyte temperature.

In view of the importance of the anode consumption on the economics of the Al-production process, great efforts have been made in recent years to study the problem. This has led to the anode consumption being correlated with a series of variables, including the electrolyte temperature, the permeability of the anode to air, and the thermal conductivity of the anode. It is now possible, based on equations, to make estimates of anode consumption which correspond approximately to the values found in industrial practice.

It is widely believed that the major component of the increased anode consumption is due to oxidation of the anode surface in contact with air. A typical distribution of the specific net consumption of carbon (with the best state-of-the-art protective aluminium coatings) is:

| Consumption | kgC/kg Al | % |
|---|---|---|
| Electrochemical | −0.334 | −76.0 |
| Current efficiency | −0.037 | −8.4 |
| Oxidation | −0.051 | −11.6 |
| Carbo-oxidation | −0.018 | −4.0 |
| Specific Net Consumption | | −0.440 |

Prebaked carbon anodes contain metallic impurities originating from the starting materials, which impurities undesirably influence the anode consumption. In particular, V, Fe, S and especially Na exert a catalytic activity influencing the anode oxidation reaction, favoring the attack by $O_2$.

Many attempts have been made to develop techniques to reduce the oxidation of prebaked carbon anodes in order to improve the efficiency, for instance by including additives in the coke-pitch mixture.

The addition of phosphorous, as phosphate or phosphoric acid, has a beneficial effect on anode consumption but undesirably pollutes the product aluminium and reduces current efficiency. For this reason, phosphorous-based treating agents such as that described in U.S. Pat. No. 4,439,491 have not been successful as oxygen inhibitors for prebaked carbon anodes used for aluminium production.

$AlF_3$ has been proposed as additive on account of the fact that it is non-polluting to the bath. A reduction of the carbon consumption is obtained, but is attributed to the fact that $AlF_3$ vapours reduce the differential reaction between coke and pitch, so the available saving is small because there is no reduction of the main oxidation.

Other compounds such as $AlCl_3$ in an amount of 1–3%, or $SiO_2$ as $H_2SiO_3$ in an amount of 0.2 to 1%, have also been tried, but without giving satisfactory results.

Boron, principally in the form of $B_2O_3$ and boric acid ($H_3BO_3$) has also been found to inhibit the catalytic agents present (such as $NaO_2$, FeO, and $V_2O_5$) by forming stable alloys therewith.

By including boron compounds in prebaked carbon anodes with a concentration which in some cases is 0.2 to 0.3 weight % or more of the entire anode, it has been possible to reduce the oxidation by up to about 50%. See for example U.S. Pat. No. 4,613,375, which proposed adding 0.5 to 1.5 weight % of inorganic additives including B and $B_2O_3$, and DE-A-35 38 294, which proposed doping the carbon making up the anode with manganese and boron or with cobalt and boron as corrosion inhibitors, with each element present in an amount of at least 0.1 and preferably at least 0.5 weight % of the carbon. These proposals, however, are still unsatisfactory because the maximum permissible boron content for an aluminium production anode should not exceed about 60 ppm in the product aluminium, which corresponds to a maximum of about 150 ppm in the entire anode.

For other applications, such as carbon anodes for arc furnaces, where boron pollution is not a problem, it has been proposed to improve the oxidation resistance by including boron in an amount of as much as about 3 weight % of the entire carbon body. See for example U.S. Pat. No. 4,770,825. Obviously, this is totally unacceptable for aluminium production anodes.

Protective coatings for aluminium production anodes have also been proposed, notably a fused layer of aluminium on the anode surfaces. This technique is economically questionable, as it requires from about 0.8 to 1.0 g Al/cm$^2$ of the anode surface, and the poor wettability of carbon by the fused aluminium leads to problems in the uniformity of such coatings. Nevertheless, coating with aluminium has been the most widely accepted expedient to date to reduce anode oxidation.

Another proposed protective coating consists of alumina, but this has the disadvantage of creating a thermal insulation around the anode, leading to local overheating and acceleration of the oxidation process. protective coatings applied onto the carbon surfaces have Attempts to coat the anodes with $B_2O_3$-based not been successful. U.S. Pat. No. 3,852,107 describes spraying a coating 0.5 to 5 mm thick onto a pre-heated anode; the spray mixture comprising a matrix of a boron compound and a refractory filler such as a carbide.

To overcome the drawbacks of previous attempts to make use of boric acid or salts thereof, DE-A-28 09 295 described coating a carbon body such as a prebaked anode for aluminium-production, by using a solution of ammonium pentaborate or ammonium tetraborate to produce a glassy coating of anhydrous boric acid ($B_2O_3$). Such coatings initially reduce the reactivity of the anode surface with oxygen, but the effect is short-lived and, once the coating has been worn away, is lost.

Such coatings remain on an external surface of the anode and can easily be mechanically damaged during transport of the anode and its installation in the cell. Also, such coatings are not perfectly impervious to gas, and cannot protect the anode from oxidation.

Problems like those described above for prebaked carbon anodes apply also to the carbon cell sidewalls including a lower part submerged in the electrolyte and an upper part which is exposed to $CO_2$-enriched air, and which disintegrate and wear away as a result of attack by oxidising gases.

SUMMARY OF THE INVENTION

An object of the invention is to improve the resistance to oxidation of a preformed carbon anode or a cell sidewall for aluminium production by the incorporation of boron without the inherent drawbacks of the known proposals.

The invention provides a method of treating a cell component, in particular a prebaked carbon-based anode or sidewall, of an electrolytic cell for the production of aluminium, in particular by the electrolysis of alumina in a molten fluoride electrolyte such as cryolite, to improve the resistance thereof to deterioration during operation of the cell by the attack of air and oxidizing gases released at the anode, using boron in acceptable amounts in the surface parts exposed in use to oxidizing gases.

The method according to the invention comprises treating the anode or other component in a boron-containing solution to intake the boron-containing solution to a selected depth over parts of the surface to be protected, this selected depth being in the range 1–10 cm, preferably at least 1.5 cm and at most about 5 cm, preferably still at least about 2 cm and at most about 4 cm.

The impregnation treatment of the invention provides a protected layer of one or several centimeters, wherein the boron penetrates in the pores into which oxidizing air/gas enter.

The treatment applies in particular to prebaked carbon anodes which are liable to be subject to mechanical damage of the external layer during transport. With the treatment according to the invention, damage to the outer surface is not detrimental to the protection against oxidation, due to the thickness of the impregnation which provides a long-lasting protective effect as the anode wears away slowly during use.

The impregnation treatment applies also to the cell sidewalls, particularly the upper part of the cell sidewall that is exposed to air and the effect of oxidizing gases during use, as well as the lower part exposed to carbo-oxidation reactions with $CO_2$ at the surface of the sidewall submerged in the electrolyte.

In the case of impregnating cell sidewalls, the protective effect can be enhanced by topcoating the impregnated sidewalls with a layer of refractory material e.g. particulate diboride in a colloidal carrier, such as titanium diboride in colloidal alumina, as described in WO 93/25731 (MOL0521).

The boron-containing solution comprises a boron compound such as $B_2O_3$, boric acid or tetraboric acid dissolved in a solvent preferably selected from methanol, ethylene glycol, glycerin, water containing at least one surface-active agent, and mixtures thereof.

Good results have been achieved with boric acid and precursors of boric acid that form $B_2O_3$. Borates have not been found to give good results.

The solution preferably contains 5–60 weight % of the boron compound in particular using a solution at a temperature in the range from 10° to 120° C., preferably 20° C. to 80° C.; these conditions ensuring excellent penetration of the solution into the porous carbon. For solutions with 50–60 weight % of boron compounds, solvents like methanol, ethylene glycol or glycerin are used at a temperature of about 80° C. or above.

It is advantageous to carry out the treatment with a heated solution in order to increase the solubility of the boron compound and decrease the treatment time. But this involves also heating the anode. Therefore, carrying the method out at ambient temperature is also convenient because no special heating equipment is required.

At low temperatures, solvents such as methanol, ethylene glycol and glycerin will be preferred, possibly with additives to enhance the solubility of the boron compound, and the treatment time may be extended to several hours. When water is used as solvent, surfactant agents in particular tensio-active cationic agents are used. Anionic tensio-active agents can also be used. Such agents should be devoid of components that would undesirably contaminate the aluminium produced and components that promote oxidation of the carbon. These surface-active agents may possibly be present together with other solubility improving agents such as tartaric acid or citric acid, and the solution may be heated to improve and to speed up the impregnation of the anode.

The use of surface active agents is an important factor to accelerate penetration of the solution and to obtain impregnation to a sufficient depth of several centimeters in only a few minutes, since long treatment times would make the process uneconomical.

The anode can be treated by immersion in the boron-containing solution for about 2 minutes to 1 hour for a heated solution, followed by drying. Usually, a single impregnation suffices, but the impregnation and drying may be repeated until the treated anode surface is saturated with the boron compound.

The treatment time depends principally on the exposed surface area of the anode and its porosity, as well as the temperature. It has been observed that prolonging the treatment does not significantly increase the boron concentration or the depth of penetration.

When a heated solution is used, it is advantageous to provide a thermostat-controlled heating installation for maintaining the solution at the desired temperature during the entire immersion time.

Anodes are conveniently impregnated simply by dipping them into the solution, which can take place in ambient conditions, but the impregnation may be assisted by the application of a pressure differential, by applying pressure or a vacuum. Other ways of speeding up impregnation can also be used, such as the application of ultrasounds.

In this way, the boron-containing solution impregnates the carbon anode to a depth of 1–10 cm, for example approximately 2 to 4 or 5 cm, with a concentration of boron in the impregnated surface of the carbon anode in the range from 200 ppm to 0.35%, or possibly even higher. Even with the highest achievable levels of boron concentration, the problem of process contamination is avoided because the protective boron compounds are present only in the top and side surfaces of the anode needing protection, and only to a depth of several centimeters.

By impregnating the parts of the anode to be protected—namely the side and top surfaces—with a small quantity of the boron compound to a depth of one or several centimeters, a long-lasting protective effect is achieved because the surfaces exposed to oxygen wear away very slowly over a long period, while avoiding undesirable contamination of the aluminium produced.

The anode is usually made of petroleum coke and pitch; the anode having an open porosity in the range 5% to 30%, preferably from 5 to 20%. The porous material making up the anode may also be a composite carbon-based material comprising at least one further component such as refractory oxycompounds, in particular alumina. Examples of such materials are described in U.S. Pat. No. 5,413,689 the contents whereof are incorporated herein by way of reference.

The impregnation treatment of a pre-baked anode according to the invention is made after calcinining where the anode surface has highest porosity, so improving the penetration of the solution to a depth of one or several centimeters.

Oxidation of the anodes increases with porosity. Thus, with the impregnation treatment, the most porous part of the anode which is most prone to damage by oxidation is protected. In other words, more porous parts of the surface to be protected are penetrated more and deeper by the boron-containing solution, providing greater protection where needed.

The intake of the boron-containing solution into the anode can monitored by checking the level of the solution, or simply by the time of immersion for a given solution and an anode of given porosity.

The top and side surfaces of the anode can be immersed in the boron-containing solution simply by dipping the anode upside down in the solution. There is no need to treat the bottom of the anode where the electrochemical reaction takes place. In this way, only those parts of the anode which need protection are treated in a simple way, and the amount of boron in the anode (and, hence, in the aluminium produced) is minimized.

The invention also concerns a prebaked carbon-based anode of an electrolytic cell for the production of aluminium, in particular by the electrolysis of alumina in a molten fluoride electrolyte such as cryolite, wherein the top and side surfaces of the anode are impregnated to a depth of 1 to 10 cm, usually 1.5 cm to 5 cm, preferably about 2 to 4 cm, with a boron compound, to improve the resistance thereof to consumption during operation of the cell by air and oxidising gases released at the anode. The central part and the lower surface of the anode are essentially devoid of the boron-containing compound.

Such an anode may be produced by the methods set out above, and may incorporate all of the features described in connection with the method.

The invention also concerns an electrolytic cell for the production of aluminium, in particular by the electrolysis of alumina in a molten fluoride electrolyte such as cryolite, comprising an anode or sidewall as set out above, the anode or sidewall being installed with the treated boron-containing surfaces of the anode in contact with air and oxidising gases released during operation of the cell.

DETAILED DESCRIPTION

To achieve an optimum protective effect against oxidation, several parameters of the treatment solution need to be balanced.

The concentration of the boron compound, in particular $H_3BO_3$ or $B_2O_3$, is important: greater concentrations provide a greater concentration gradient, favoring the kinetics of penetration of the solution into the porous anode. Solubility of the boron compounds can be increased by maintaining the solution at a suitable high temperature.

The coefficient of diffusion of the solution into the porous carbon structure and the wettability of the carbon by the solution will influence the rate and the degree of penetration. Solutions with low surface tension providing an angle of contact with the carbon of less than 90° provide adequate wettability and facilitate penetration. A suitable high solution temperature will also enhance diffusion of the solution.

Solvents with a low degree of inflammability are desirable. Should flammable solvents impregnate the carbon, this could lead to unwanted heat generation favoring oxidation of the carbon.

The type of solvent chosen directly influences the variability of the process parameters and in particular the results, especially the depth of penetration of the solution.

By using solvents selected from methanol, ethylene glycol, glycerin and mixtures thereof, at a temperature from 80° to 120° C., a concentration of 50–60 weight % of $H_3BO_3$ or $B_2O_3$ can be achieved in the solution, or about 20% when water with a surface-active agent is used as solvent. Such solutions have desirable physio-chemical properties, providing excellent impregnation by immersion of an anode in about 2–60 minutes. In these conditions, treatment of an anode having a porosity of about 15–18% and a surface area of 2–3 $m^2$ produces an impregnation to a depth of about 3–4 cm with a boron concentration of several hundreds of ppm.

When water is chosen as solvent, a surfactant is used in order to achieve an acceptable low treatment time.

In practice, the treatment solution can first be prepared using metering means to mix the $H_3BO_3$ or $B_2O_3$ in the chosen solvent, in the desired proportions, in a container provided with a thermostatically-controlled heater and a mechanical mixer. The solution can then be heated to its use temperature in the range of 80° to 120° C., for example, and the hot solution transferred to a thermostatic vessel equipped with a level indicator.

Generally, a boron salt is added to the solvent in a quantity sufficient to guarantee saturation of the solution upon heating, leaving a deposit of the undissolved salt in the bottom of the vessel.

The anode to be treated is then dipped in the vessel, upside down, so its top and side surfaces are immersed in the hot solution. Immersion is continued for a set time, e.g. from 2–60 minutes, or until the level indicator has indicated a desired intake of the solution into the treated surfaces. The treated anode is then removed and dried. The vessel is then topped up to its initial level with hot solution from the container, ready for the treatment of another anode.

The vapors produced in the described conditions are non toxic and can be freely released into the air without a need for costly treatment installations.

The carbon consumption due to air-oxidation of anodes treated this way corresponds to about 12–15% with respect to the net consumption, which is comparable to what can be achieved with traditional aluminium protective coatings. Thus, the invention provides an excellent and long-lasting protective effect at much less cost and with less risk of imperfections in the protection than with aluminium coatings.

The components of the treatment solution are inexpensive and are non-polluting both for the aluminium production process and for the environment. The method is simple to carry out, and the treated surfaces are uniformly impregnated with the boron compounds, leading to reliability in use because of uniform wear to the exposed surfaces of the anode or sidewall. Also, as boron acts as a "negative catalyst", it is possible to make the anode and sidewall from carbon powder containing a higher content of vanadium, thereby reducing the cost of raw materials.

We claim:

1. A method of treating a carbonaceous cell component of an electrolytic cell for the production of aluminium, to improve the resistance of said component to deterioration during operation of the cell by attack of air and anodically-releasing oxidizing gases, by treating a surface of said carbonaceous cell component with a boron-containing solution, wherein said solution is at temperatures up to 120° C., wherein the method comprises intaking the boron-containing solution to a selected depth of 1–10 cm into the component to be protected.

2. The method of claim 1, wherein the cell component is a prebaked carbon anode.

3. The method of claim 2, wherein the treatment is carried out by immersion of the anode in the boron-containing solution at a temperature in the range 10° to 120° C.

4. The method of claim 3, wherein the anode is immersed in the boron-containing solution for about 2 minutes to 1 hour.

5. The method of claim 3, wherein the intake of the boron-containing solution into the anode is monitored by checking the level of the solution.

6. The method of claim 3, wherein top and side surfaces of the anode are immersed in the boron-containing solution by dipping the anode upside down in the solution.

7. The method of claim 3 wherein said temperature range is from 20° C. to 80° C.

8. The method of claim 2, wherein the anode is made of petroleum coke and pitch, or is a composite material comprising predominantly petroleum coke and pitch, the anode having an open porosity in the range 5% to 30%.

9. An electrolytic cell for the production of aluminium by the electrolysis of alumina in a molten fluoride electrolyte, comprising an anode according to claim 8, wherein the anode is installed with its treated surfaces in contact with air and oxidizing gases released during operation of the cell.

10. The method of claim 1, wherein the cell component is a sidewall.

11. The method of claim 10, which comprises applying a coating of refractory boride on top of the surface of the sidewall impregnated with the boron-containing solution.

12. The method of claim 11 wherein said coating of refractory metal boride is a coating of particulate titanium diboride in colloidal alumina.

13. The method of claim 1, wherein the boron-containing solution comprises a boron compound dissolved in a solvent selected from methanol, ethylene glycol, glycerin, water containing at least one surface-active agent, and mixtures thereof.

14. The method of claim 1, wherein the solution contains $B_2O_3$, boric acid or tetraboric acid.

15. The method of claim 1, wherein the solution contains 5–60 weight % of boron compound.

16. The method of claim 1, wherein the boron-containing solution impregnates the carbon component to a depth of approximately 2 to 4 cm.

17. The method of claim 1, wherein the concentration of boron in the surface of the carbon component is in the range from 200 ppm to 0.35%.

18. An electrolytic cell for the production of aluminium by the electrolysis of alumina in a molten fluoride electrolyte, comprising a component treated by the method of claim 1, the component being installed with its treated surface in contact with air and oxidizing gases released during operation of the cell.

19. The cell of claim 18, wherein the component is a prebaked carbon anode.

20. The cell of claim 18, wherein the component is a sidewall.

21. The cell of claim 20, wherein the treated surface of the sidewall is coated with a coating of refractory boride.

22. The cell of claim 21, wherein the treated surface of the sidewall is coated with titanium diboride in dried colloidal alumina.

23. The method of claim 1 wherein the aluminum is produced by electrolysis of alumina in a molten fluoride electrolyte.

24. A prebaked carbonaceous anode of an electrolytic cell for the production of aluminium, wherein the anode has top and side surfaces which in use are exposed to oxidising gases, wherein said top and side surfaces are impregnated to a depth of 1 to 10 cm with a boron compound selected from the group consisting of $B_2O_3$, boric acid, tetraboric acid or precursors of boric acid that form $B_2O_3$, to improve the resistance thereof to erosion during operation of the cell by air and anodically-released oxidizing gases, the anode having a central part and a lower surface part which are essentially devoid of the boron-containing compound, and wherein the total boron content in the entire anode is less than or equal to 150 ppm.

25. The anode of claim 24, wherein the boron-containing compound is derived from $B_2O_3$, boric acid, and tetraboric acid.

26. The anode of claim 25, wherein the concentration of boron in the impregnated surface is in the range from 200 ppm to 0.35%.

27. The anode of claim 25, which is made of petroleum coke and pitch, or is a composite material comprising predominantly petroleum coke and pitch, the anode having an open porosity in the range 5% to 30%.

28. The anode of claim 24, wherein the boron-containing compound impregnates the carbon anode to a depth of approximately 2 to 4 cm.

* * * * *